J. LACHANCE.
PLOWING DEVICE.
APPLICATION FILED JUNE 4, 1919.
1,376,147.
Patented Apr. 26, 1921.
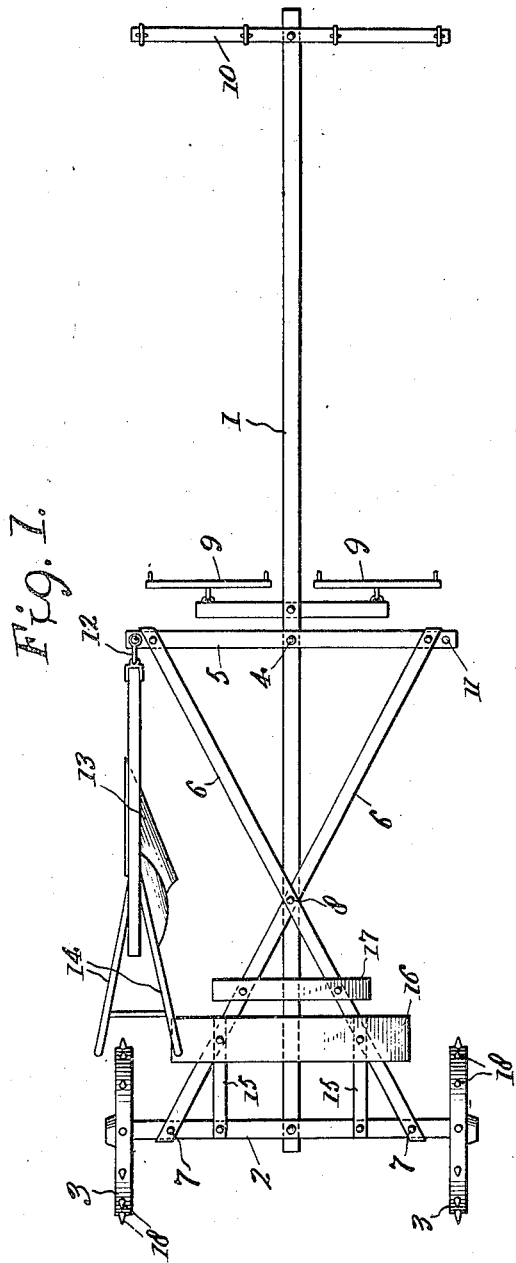
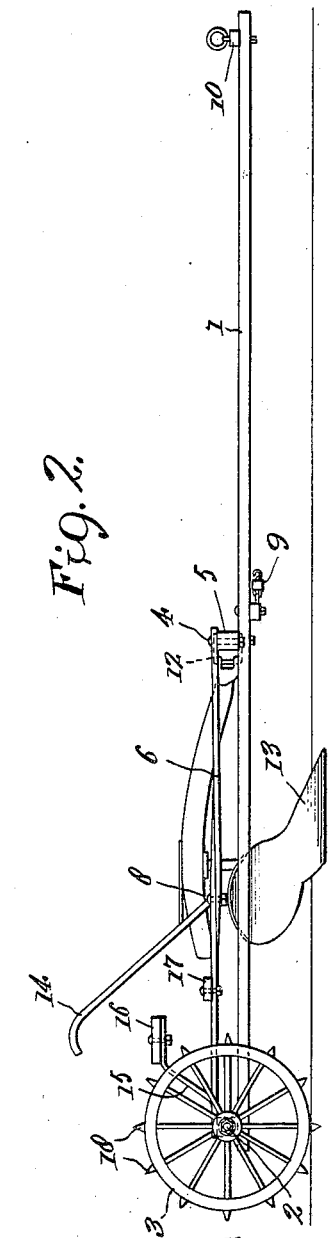
Inventor.
Joseph Lachance.
by Joshua R.H. Potts
Attorney.

UNITED STATES PATENT OFFICE.

JOSEPH LACHANCE, OF MORGAN HILL, CALIFORNIA.

PLOWING DEVICE.

1,376,147. Specification of Letters Patent. Patented Apr. 26, 1921.

Application filed June 4, 1919. Serial No. 301,712.

*To all whom it may concern:*

Be it known that I, JOSEPH LACHANCE, a citizen of the United States, residing at Morgan Hill, county of Santa Clara and State of California, have invented certain new and useful Improvements in Plowing Devices, of which the following is a specification.

My invention relates to plowing devices, and particularly to devices especially adapted for orchard work.

The object of my invention is to provide a device of the character mentioned by means of which the plowing may be readily done close to the trees without injury to the same. A further object of my invention is to provide a device of the character mentioned which shall effectually prevent the plow from sinking too deeply into the ground. A further object of my invention is to provide a device of the character mentioned of such construction as to eliminate the side draft. Other objects will appear hereinafter.

With these objects in view, my invention consists generally in a frame comprising a pole, an axle at the rear end thereof, a cross bar intermediate the ends of the pole, a pair of cross braces secured at their ends to said cross bar and said axle and at their point of intersection to said pole, and means for attaching the plow to either end of said cross bar. My invention further consists in a device as mentioned further characterized by a seat arranged above said frame and positioned so that the handles of the plow shall be above the same. My invention further consists in various details of construction and arrangement of parts all as will be fully described hereinafter and particularly pointed out in the claims.

My invention will be more readily understood by reference to the accompanying drawings forming a part of this specification and in which—

Figure 1 is a plan view of the device, and

Fig. 2 is a side elevation thereof.

Referring now to the drawings, 1 indicates the pole which extends longitudinally throughout the length of the device. To the rear end of the pole 1 is secured an axle 2 upon the ends of which are mounted wheels 3. Intermediate the ends of the pole is secured, as by a bolt 4, a cross bar 5. Diagonal brace bars 6 are secured to the bar 5 adjacent the outer ends thereof and have their rear ends secured, as at 7, to the axle 2 adjacent its outer ends. These brace bars cross above the pole 1 and are secured together, as by a bolt 8. When the device is to be drawn by horse-power, the pole 1 is equipped forwardly of the cross bar 5 with suitable double-trees 9, and at the forward end with a neck yoke 10.

The cross bar 5, adjacent its ends, is provided with aperture 11 to receive a clevis 12 for the plow 13. The plow 13 is of any ordinary form and has the usual handles 14. In using the device, the plow may be attached either to the lefthand side, when it is desired to plow the ground away from the trees, or to the lefthand side when it is desired to plow toward the trees.

Extending upwardly and forwardly from the axle 2 are supporting members 15 which support a seat 16 above the frame and slightly forwardly of the wheels 3 so as to permit the driver to readily pass between the wheel and the handles 14 of the plow. A foot-rest 17 may be secured to the brace bars 6, if desired.

When the device is to be used for plowing on steep hillsides, the wheels may be provided with radial spurs or flanges 18 which will prevent lateral, down-grade movement of the device.

With a device as above described, it is obvious that the plowing may be accomplished close to the trees in an orchard without injury thereto, as the plow is under complete control of the driver. The arrangement of the neck yoke and the double-trees, and particularly when in combination with the elements 18 prevent unsteady or lateral movements of the device, even when plowing upon the sides of steep hills. Also with the plow attached by the clevis 12 and with the handles 14 extending conveniently above the seat 16, the plow may be turned sidewise as found necessary or desirable by the operator.

I claim:—

1. In a device of the class described, a frame comprising a longitudinal pole, an axle secured to the rear end of the pole, wheels on the ends of said axle, a cross bar secured to said pole intermediate the ends thereof, cross braces having their ends secured to said cross bar and said axle respectively adjacent the ends thereof, and means for attaching a plow to either end of said cross bar, substantially as described.

2. In a device of the class described, a longitudinally disposed pole, an axle fixed to the rear end of said pole, a cross bar secured to said pole intermediate the ends thereof, cross braces having their ends secured, respectively, to said cross bar and said axle adjacent the ends thereof, wheels on the ends of said axle, a seat supported forwardly of said wheels, a plow, and means for attaching said plow to either end of said cross bar with the handles extending above said seat, substantially as described.

In testimony whereof I have signed my name to this specification in the presence of two subscribing witnesses.

JOSEPH LACHANCE.

Witnesses:
MARY E. MAST,
MARTHA C. MAST.